(Model.)
J. E. MITCHELL.
SHOVEL FOR CULTIVATORS.
No. 272,301. Patented Feb. 13, 1883.
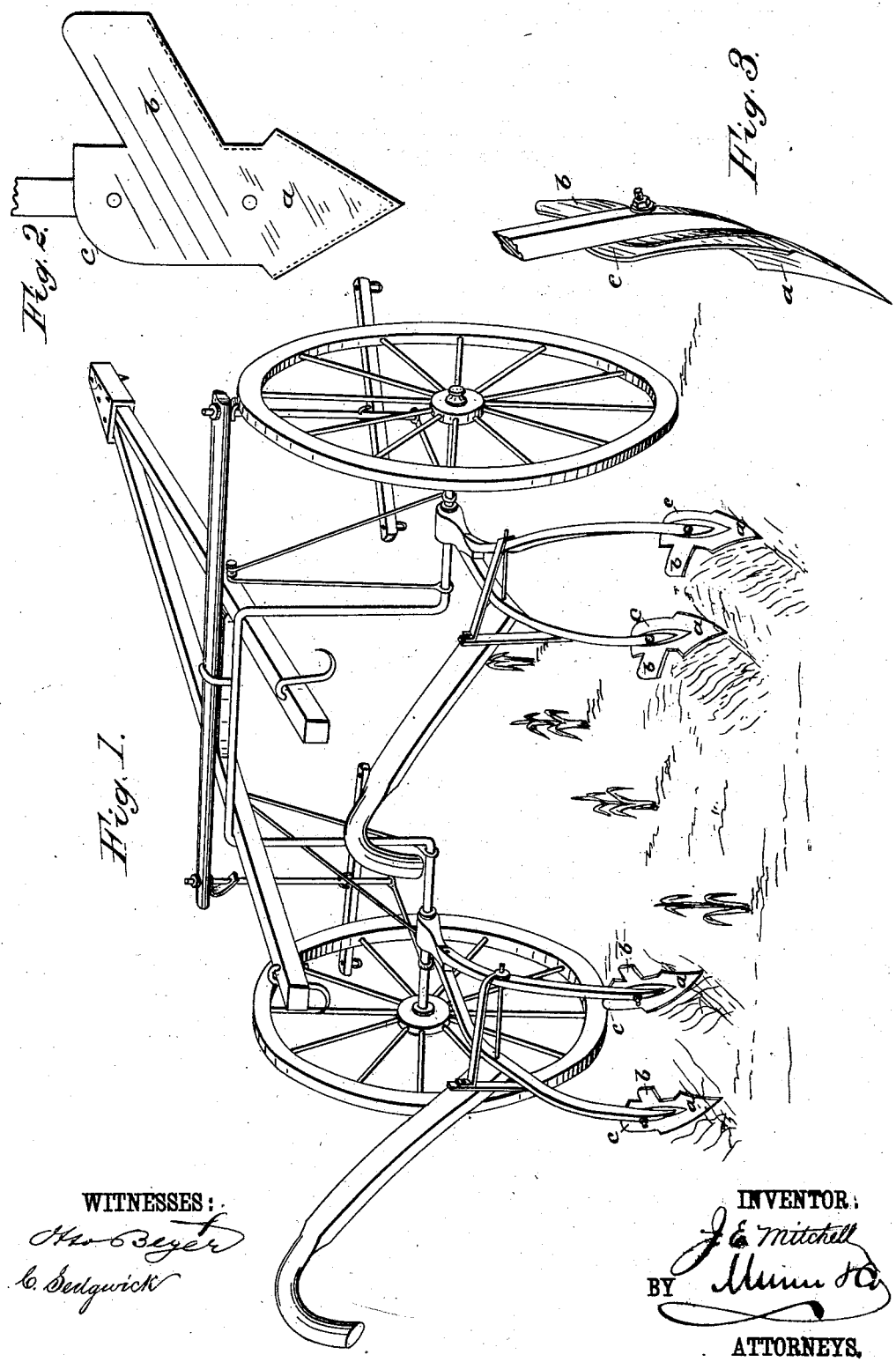

UNITED STATES PATENT OFFICE.

JOHN E. MITCHELL, OF FOWLER, ASSIGNOR OF ONE-HALF TO ADAMS D. RAUB, OF EARL PARK, INDIANA.

SHOVEL FOR CULTIVATORS.

SPECIFICATION forming part of Letters Patent No. 272,301, dated February 13, 1883.

Application filed November 13, 1882. (Model.)

*To all whom it may concern:*

Be it known that I, JOHN E. MITCHELL, of Fowler, in the county of Benton and State of Indiana, have invented a new and Improved Gopher-Shovel for Cultivators, of which the following is a full, clear, and exact description.

My invention consists of an improved gopher attachment to cultivator-shovels for cultivating corn, the said attachment being contrived for ridging the earth up around the plants in the later dressing, when they are well grown, without injury to the roots, all as hereinafter fully described.

Reference is to be had to the accompanying drawings, forming part of this specification, in which similar letters of reference indicate corresponding parts in all the figures.

Figure 1 is a perspective view of a cultivator with shovels or plows having gopher attachments according to my invention. Fig. 2 is a front elevation of one of the gopher-shovels, and Fig. 3 is a perspective view of the shovel.

To the blade $a$ of a common cultivator-plow, or any equivalent form of the same—as the narrower "bull-tongue"—I propose to apply or form together therewith the gopher extension $b$, upon the right or left side, according to the side of the row of plants the shovel is to work, the said extension being located about midway between the top of the taper of the point and the top of the shovel, and its surface being in uniformity with that of the shovel $a$—that is to say, flush and smooth therewith at the junction.

By preference the plow-plate, together with the attachment, will be cut out of a plate together; but they may be welded together, if preferred.

The lower edge of the gopher $b$ is designed to run about as high as the surface of the unplowed earth, so that the earth raised up from the plow $a$ below will be received by the gopher and brushed over said surface to and around the roots of the plants, the plow being set suitably oblique to the line of the rows to discharge the earth on that side, as clearly shown in Fig. 1. It will thus be seen that the shovel $a$ may run sufficiently far away from the plants to raise up the fresh earth required without disturbing the roots, while the gopher will ridge it up to the stalks over the roots. By the uniformity of the surfaces of the shovel and gopher attachment the latter will "scour" the same as the rest, and thus the whole will keep bright and clean, and this I propose to facilitate by curving or rounding the forward and outermost corner, $c$, of the shovel-blade, by which the tendency to catch weeds, grass, and other trash, and thereby unite all the caking of the soil on the shovel, is prevented.

These improved shovels may be mounted in the machine by any preferred arrangement or contrivance of apparatus.

Having thus described my invention, what I claim as new, and desire to secure by Letters Patent, is—

A shovel or cultivator blade made with a lateral extension, $b$, at about the middle of its shank, and inclined upwardly at an oblique angle to the latter, as shown in Fig. 2 of the drawings, whereby it may be adapted to be used as described.

JOHN E. MITCHELL.

Witnesses:
ISAAC H. PHARES,
L. D. HAWLEY.